(12) United States Patent
Numajiri et al.

(10) Patent No.: US 8,596,614 B2
(45) Date of Patent: Dec. 3, 2013

(54) METHOD FOR HOISTING AND LOWERING DEVICE IN ROTOR HEAD OF WIND TURBINE GENERATOR

(75) Inventors: Tomohiro Numajiri, Tokyo (JP); Yoshihiro Fujioka, Nagasaki (JP); Atsushi Imanaga, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 733 days.

(21) Appl. No.: 12/739,013

(22) PCT Filed: Feb. 10, 2010

(86) PCT No.: PCT/JP2010/051998
§ 371 (c)(1),
(2), (4) Date: Apr. 21, 2010

(87) PCT Pub. No.: WO2011/099134
PCT Pub. Date: Aug. 18, 2011

(65) Prior Publication Data
US 2012/0014775 A1 Jan. 19, 2012

(51) Int. Cl.
*B66D 1/00* (2006.01)
(52) U.S. Cl.
USPC ............................................ 254/329; 254/332
(58) Field of Classification Search
USPC ................... 254/266, 329, 335, 338
See application file for complete search history.

(56) References Cited

U.S. PATENT DOCUMENTS

| | | | |
|---|---|---|---|
| 6,364,609 B1 * | 4/2002 | Barnes | 416/142 |
| 7,704,024 B2 | 4/2010 | Kootstra et al. | |
| 7,735,808 B2 * | 6/2010 | Viladomiu i Guarro et al. | 254/278 |
| 7,789,252 B2 * | 9/2010 | Dehlsen et al. | 212/179 |
| 8,083,212 B2 * | 12/2011 | Numajiri et al. | 254/278 |
| 8,118,552 B2 * | 2/2012 | Nies | 416/1 |
| 8,319,363 B2 * | 11/2012 | Song et al. | 290/44 |
| 2003/0183594 A1 * | 10/2003 | Torres Martinez | 212/196 |
| 2004/0169376 A1 * | 9/2004 | Ruer et al. | 290/55 |
| 2006/0151767 A1 * | 7/2006 | Wobben | 254/334 |
| 2006/0175465 A1 * | 8/2006 | Teichert | 244/33 |
| 2007/0151194 A1 * | 7/2007 | Livingston et al. | 52/651.05 |
| 2008/0078128 A1 * | 4/2008 | Livingston et al. | 52/40 |
| 2008/0245756 A1 * | 10/2008 | Dehlsen et al. | 212/224 |

(Continued)

FOREIGN PATENT DOCUMENTS

| | | |
|---|---|---|
| EP | 1101934 A2 | 5/2001 |
| JP | 2004293455 A | 10/2004 |

(Continued)

OTHER PUBLICATIONS

ISR for PCT/JP2010/051998 dated Mar. 23, 2010.

(Continued)

*Primary Examiner* — Emmanuel M Marcelo
(74) *Attorney, Agent, or Firm* — Kanesaka Berner & Partners, LLP

(57) ABSTRACT

There is provided a method for hoisting and lowering a device in a rotor head of a wind turbine generator, that can easily perform a device hoisting and lowering operation in the rotor head without an external crane. The method for hoisting and lowering a device in a rotor head includes a step of mounting a temporary winch rail to a rail support portion previously provided in the rotor head, a step of installing a temporary winch on the temporary winch rail, a step of opening a maintenance hatch provided in the rotor head, and a step of hoisting and lowering a replacement device to be attached or removed in the rotor head through a hoisting and lowering opening in the maintenance hatch by the temporary winch.

13 Claims, 7 Drawing Sheets

(56) References Cited

U.S. PATENT DOCUMENTS

| | | |
|---|---|---|
| 2008/0257844 A1* | 10/2008 | Llorente Gonzalez et al. .............................. 212/179 |
| 2011/0138595 A1* | 6/2011 | Shiraishi et al. ........... 29/402.03 |
| 2011/0162194 A1* | 7/2011 | Sugimoto .................... 29/592.1 |
| 2011/0211955 A1* | 9/2011 | Eriksen et al. ..................... 416/9 |

FOREIGN PATENT DOCUMENTS

| | | |
|---|---|---|
| JP | 2005531709 A | 10/2005 |
| JP | 2009002175 A | 1/2009 |
| JP | 2009002206 A | 1/2009 |
| WO | 03/102409 A1 | 12/2003 |
| WO | 2005/031159 A1 | 4/2005 |
| WO | 2008/069818 A1 | 6/2008 |

OTHER PUBLICATIONS

Extended European Search Report dated Sep. 19, 2013, corresponds to EP Patent Application 10712686.4.

* cited by examiner

METHOD FOR HOISTING AND LOWERING DEVICE IN ROTOR HEAD OF WIND TURBINE GENERATOR

RELATED APPLICATIONS

The present application is a national phase of, and claims priority from, International Application Number PCT/JP2010/051998, filed Feb. 10, 2010, the disclosure of which is hereby incorporated by reference herein in its entirety.

TECHNICAL FIELD

The present invention relates to a method for hoisting and lowering a device in a rotor head of a wind turbine generator.

BACKGROUND ART

A wind turbine generator is an apparatus in which a rotor head including a wind turbine blade is rotated by wind power, and a generator driven by increasing the speed of the rotation with a gear box or the like generates electricity.

The above-described rotor head is mounted to an end of a nacelle that is provided on a wind turbine tower (hereinafter referred to as "tower") and can yaw, and supported rotatably around a substantially horizontal, lateral rotation axis.

In a conventional wind turbine generator, devices in a rotor head are hoisted, lowered and replaced in the following procedure.

First, an operator enters inside the rotor head, and removes a replacement device mainly by human power. Then, the replacement device is moved into a nacelle by human power, and moved down to the ground using a winch provided in the nacelle.

When newly mounted, a replacement device is lifted from the ground into the nacelle using the winch, and then moved from inside the nacelle to the rotor head by human power in reverse order of the removal operation.

For a conventional wind turbine generator, a method for hoisting and lowering a wind turbine facility is known using a reciprocating winch lifted by a permanent winch in a nacelle to reduce costs required for a hoisting and lowering operation of a large facility in the nacelle (for example, see Patent Literature 1).

Patent Literature 2 listed below discloses a technique on a method for transporting a wind turbine generator.

CITATION LIST

Patent Literature

{PTL 1} Japanese Unexamined Patent Application, Publication No. 2009-2175
{PTL 2} US Patent Application, Publication No. 2007/0189895

SUMMARY OF INVENTION

Technical Problem

As described above, for the conventional wind turbine generator, the operations for hoisting and lowering and replacing the device in the rotor head substantially need to rely on human power, and there is a problem in operability. In particular, recent wind turbine generators have been increased in size, and thus devices replaced in a rotor head have been also increased in size and weight, and measures for improving operability of hoisting and lowering have been desired.

An external crane may be prepared under a wind turbine generator to hoist and lower a device in a rotor head to perform a replacement operation, which requires high costs and is unpreferable. The wind turbine generator is often installed in a place into which an external crane cannot be easily carried, such as a mountain ridge.

The present invention is achieved in view of the above-described circumstances, and has an object to provide a method for hoisting and lowering a device in a rotor head of a wind turbine generator, that can easily perform a device hoisting and lowering operation in the rotor head, particularly, a device hoisting and lowering operation (construction) of a heavy load without an external crane.

Solution to Problem

To achieve the above-described object, the present invention adopts the following solutions.

A first aspect of the present invention provides a method for hoisting and lowering a device in a rotor head of a wind turbine generator, in which a rotor head rotated by wind power applied to a wind turbine blade drives a generator installed in a nacelle and generates electricity, and the nacelle is installed on an upper end of a tower standing on a foundation, including steps of: mounting a temporary winch rail to a rail support portion previously provided in the rotor head; installing a temporary winch on the temporary winch rail; opening a maintenance hatch provided in the rotor head; and hoisting and lowering a replacement device to be attached or removed in the rotor head through an opening in the maintenance hatch by the temporary winch.

According to the first aspect, the method includes the steps of: mounting the temporary winch rail to the rail support portion previously provided in the rotor head; installing the temporary winch on the temporary winch rail; opening the maintenance hatch provided in the rotor head; and hoisting and lowering the replacement device to be attached or removed in the rotor head through the opening in the maintenance hatch by the temporary winch. Thus, the temporary winch installed in the rotor head can hoist and lower the replacement device in the rotor head to perform a hoisting and lowering operation.

A second aspect of the present invention provides a method for hoisting and lowering a device in a rotor head of a wind turbine generator, in which a rotor head rotated by wind power applied to a wind turbine blade drives a generator installed in a nacelle and generates electricity, and the nacelle is installed on an upper end of a tower standing on a foundation, including steps of: mounting a temporary winch rail including a hoisting and lowering pulley to a rail support portion previously provided in the rotor head; opening a maintenance hatch provided in the rotor head; suspending an end of a wire rope of an in-nacelle winch permanently provided in the nacelle from the hoisting and lowering pulley via one or more pulleys installed in an appropriate position in the nacelle and the rotor head; and hoisting and lowering a replacement device to be attached or removed in the rotor head through an opening in the maintenance hatch by the in-nacelle winch.

According to the second aspect, the method includes the steps of: mounting the temporary winch rail including the hoisting and lowering pulley to the rail support portion previously provided in the rotor head; opening the maintenance hatch provided in the rotor head; suspending the front end from the hoisting and lowering pulley via one or more pulleys installed in the appropriate position in the nacelle and the rotor head using the wire rope of the in-nacelle winch permanently provided in the nacelle; and hoisting and lowering the replacement device to be attached or removed in the rotor head through the opening in the maintenance hatch by the in-nacelle winch. Thus, the in-nacelle winch permanently provided in the nacelle can be effectively used to hoist and lower the replacement device in the rotor head to perform a hoisting and lowering operation.

A third aspect of the present invention provides a method for hoisting and lowering a device in a rotor head of a wind turbine generator, in which a rotor head rotated by wind power applied to a wind turbine blade drives a generator installed in a nacelle and generates electricity, and the nacelle is installed on an upper end of a tower standing on a foundation, including steps of: mounting a temporary winch rail including a hoisting and lowering pulley to a rail support portion previously provided in the rotor head; installing a temporary winch in the nacelle; opening a maintenance hatch provided in the rotor head; suspending an end of a wire rope of the temporary winch from the hoisting and lowering pulley via one or more pulleys installed in an appropriate position in the nacelle and the rotor head; and hoisting and lowering a replacement device to be attached or removed in the rotor head through an opening in the maintenance hatch by the temporary winch.

According to the third aspect, the method includes the steps of: mounting the temporary winch rail including the hoisting and lowering pulley to the rail support portion previously provided in the rotor head; installing the temporary winch in the nacelle; opening the maintenance hatch provided in the rotor head; suspending the front end from the hoisting and lowering pulley via one or more pulleys installed in the appropriate position in the nacelle and the rotor head using the wire rope of the temporary winch; and hoisting and lowering the replacement device to be attached or removed in the rotor head through the opening in the maintenance hatch by the temporary winch. Thus, the temporary winch installed in the nacelle can hoist and lower the replacement device in the rotor head to perform a hoisting and lowering operation.

In each of the aspects, the maintenance hatch is preferably openably/closably mounted to an opening exclusively for a hoisting and lowering operation formed in a head capsule of the rotor head, and this further facilitates the hoisting and lowering operation.

Advantageous Effects of Invention

According to the present invention described above, a hoisting and lowering operation of a device installed in the rotor head, particularly, a device hoisting and lowering operation of a heavy load can be easily performed using the temporary winch or the winch permanently provided in the nacelle, thereby advantageously eliminating the need for an external crane.

DESCRIPTION OF EMBODIMENTS

Now, an embodiment of a wind turbine generator according to the present invention will be described with reference to the drawings.

Figure 7:
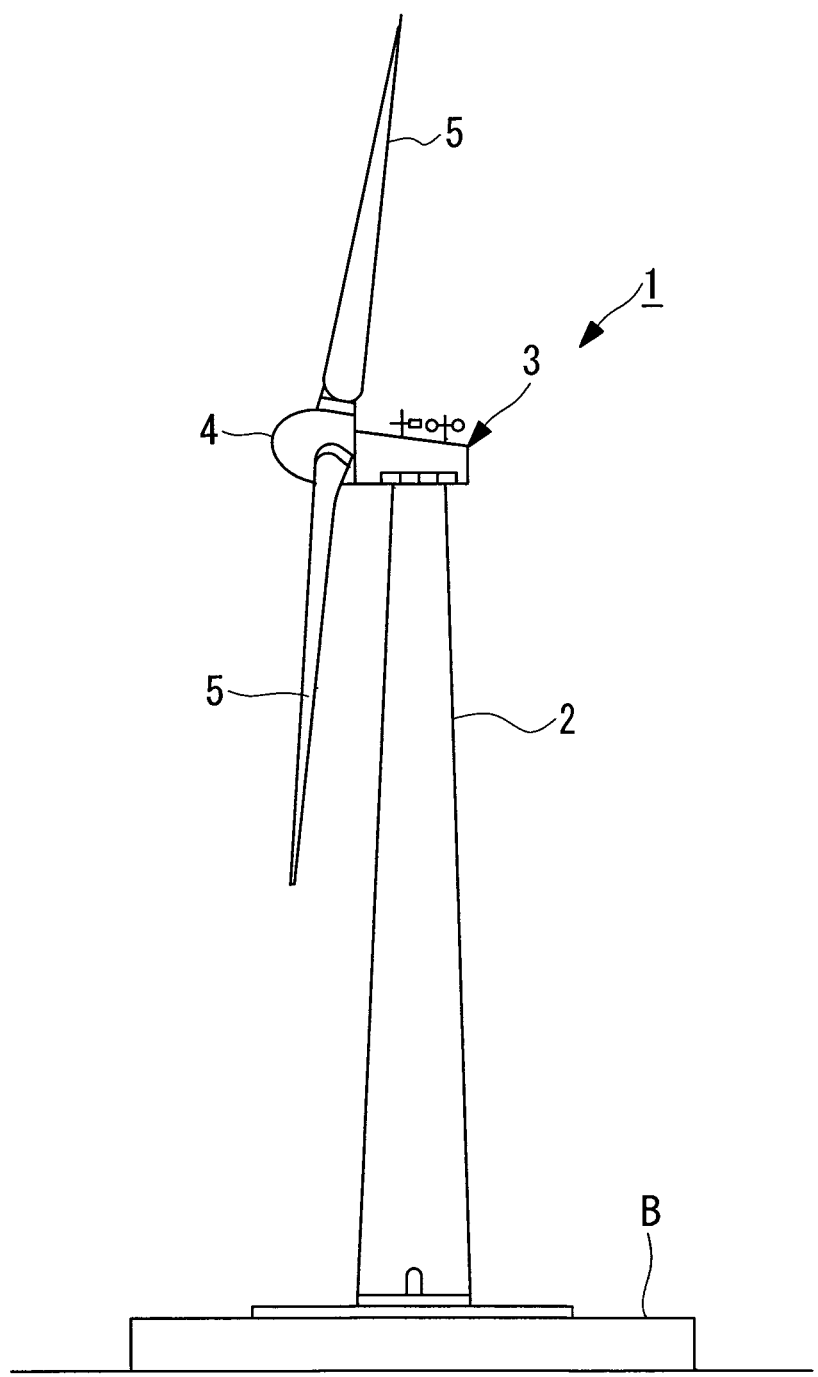
FIG. 7 is a side view showing an outline of a wind turbine generator.

A wind turbine generator 1 shown in FIG. 7 includes a wind turbine tower 2 standing on a foundation B, a nacelle 3 installed on an upper end of the tower 2, and a rotor head 4 supported rotatably around a substantially horizontal, lateral rotation axis and provided on a front end side of the nacelle 3.

A plurality of (for example, three) wind turbine blades 5 are mounted to the rotor head 4 radially around the rotation axis. Thus, wind power applied to the wind turbine blade 5 from a direction of the rotation axis of the rotor head 4 is converted into power for rotating the rotor head 4 around the rotation axis.

In an appropriate position (for example, an upper portion) on an outer peripheral surface of the nacelle 3, an anemometer that measures a wind speed value of the surroundings, an anemoscope that measures a wind direction, and the like are installed.

Specifically, in the wind turbine generator 1, the rotor head 4 rotated around the substantially horizontal rotation axis by wind power applied to the wind turbine blade 5 drives a generator (not shown) installed in the nacelle 3 and generates electricity, and the nacelle 3 is installed on the upper end of the tower 2 standing on the foundation B and can yaw.

The shown tower 2 is a monopole tower made of steel, and flanges (not shown) of a plurality of divided tower sections are connected to form a cylindrical tower ensuring a required length (height).

In the wind turbine generator 1, various devices are installed in the nacelle 3 or the rotor head 4. An example of the devices installed in the rotor head 4 is a pitch control mechanism that adjusts a pitch angle of the wind turbine blade 5 by hydraulic pressure. Such devices include component parts or consumable parts that need to be replaced by regular maintenance or the like. A hoisting and lowering operation of, particularly, a heavy load that cannot be easily carried by an operator can be performed without an external crane, using a method for hoisting and lowering a device in a rotor head described below.

First Embodiment

A first embodiment of a method for hoisting and lowering a device in a rotor head of a wind turbine generator according to the present invention will be described with reference to FIGS. 1 to 4.

Figure 1:
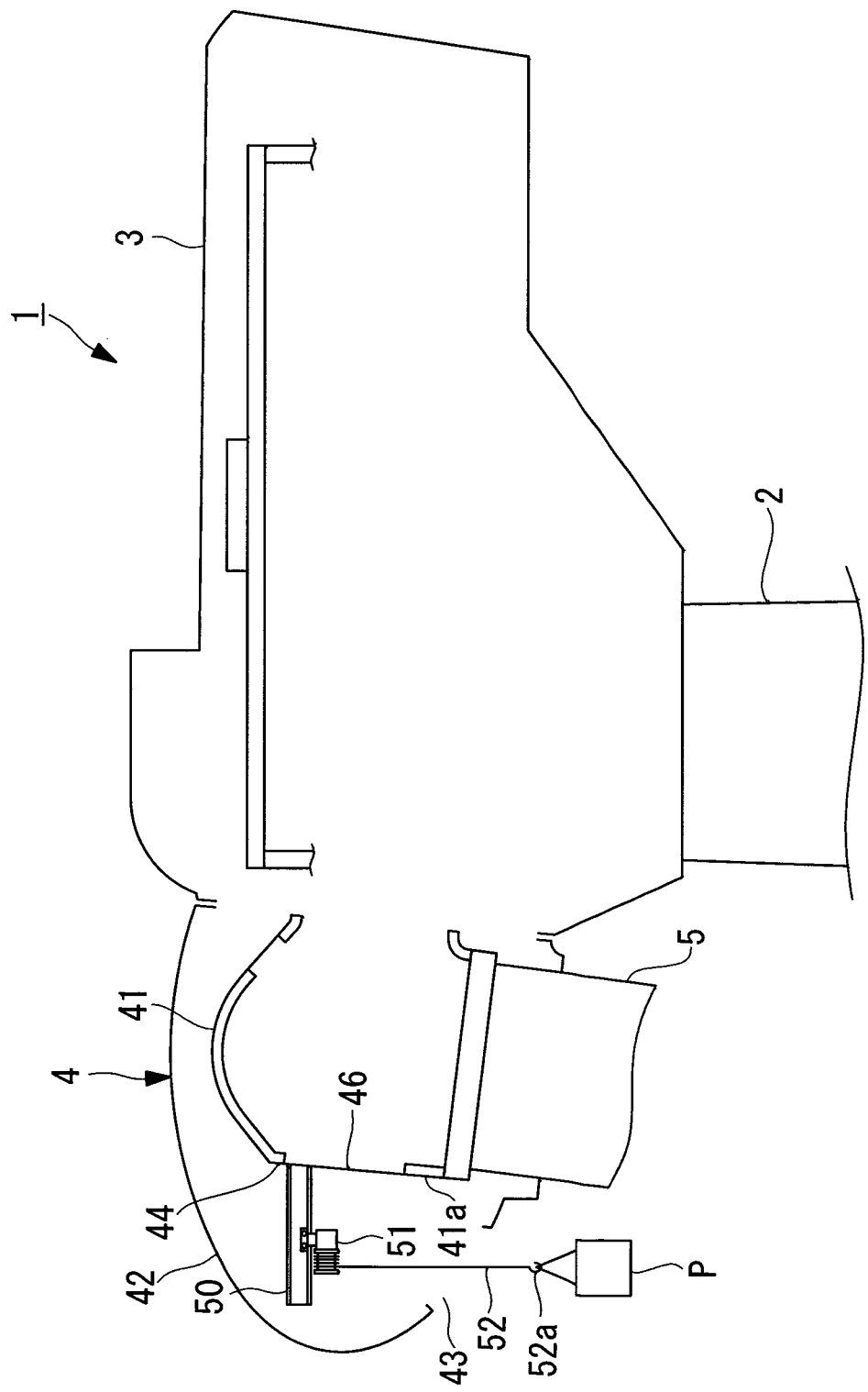
FIG. 1 is a schematic sectional view of a nacelle and a rotor head for illustrating a first embodiment of a method for hoisting and lowering a device in a rotor head of a wind turbine generator according to the present invention.
Figure 2:
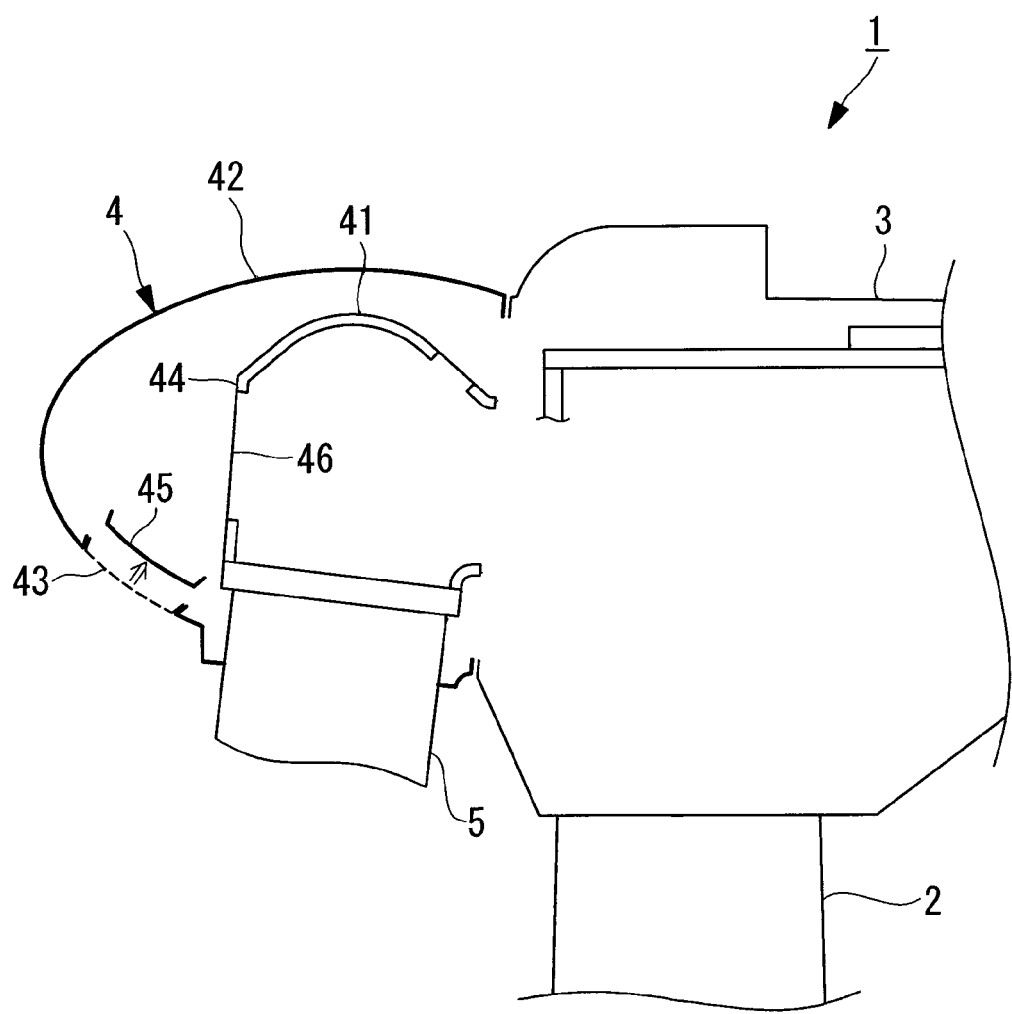
FIG. 2 is a sectional view showing a structure example of a maintenance hatch provided in a head capsule provided at a front end of the rotor head.

A rotor head 4 shown in FIG. 1 includes a rotor head body 41 to which a wind turbine blade 5 is mounted and that is coupled to a main shaft (not shown), and a head capsule 42 that is provided around the rotor head body 41 and integrally rotated. Reference numeral 43 in the drawing denotes a hoisting and lowering opening, 50; a temporary winch rail, 51; a temporary winch, 52; a wire rope, and P; a replacement device (part).

The method for hoisting and lowering a device in a rotor head of this embodiment includes the step of mounting the temporary winch rail 50 to a rail support portion 44 previously provided in the rotor head 4 (hereinafter referred to as "rail temporarily providing step"), the step of installing the temporary winch 51 on the temporary winch rail 50 (hereinafter referred to as "winch temporarily providing step"), the step of opening a maintenance hatch 45 provided in the rotor head 4 (hereinafter referred to as "opening forming step"), and the step of hoisting and lowering the replacement device P to be attached or removed in the rotor head 4 through an opening in the maintenance hatch 45 by the temporary winch 51 (hereinafter referred to as "hoisting and lowering step"), in order from a start of a hoisting and lowering operation.

In the first rail temporarily providing step, the temporary winch rail 50 is mounted to a predetermined position in the rotor head 4. Specifically, the temporary winch rail 50 fixedly supported and stored in an appropriate position in the rotor head body 41 is fixedly mounted to the rail support portion 44 previously provided on the rotor head body 41, for example, by a bolt or a nut. The rail support portion 44 is desirably provided, for example, around a maintenance opening 46 provided in a front end 41a of the rotor head body 41, particularly, around an upper portion of the maintenance opening 46.

The temporary winch rail 50 thus mounted protrudes substantially horizontally forward from the front end 41a of the rotor head body 41 into an inner space of the head capsule 42.

In the next winch temporarily providing step, the temporary winch 51 is installed on the temporary winch rail 50 fixedly supported by the rotor head body 41. The temporary winch 51 is previously fixedly supported and stored in a predetermined position in the rotor head body 41 or brought in during the operation, and desirably has a higher capacity than a winch (not shown) permanently provided in the nacelle 3.

As the temporary winch 51, for example, an electric winch connected to a power supply provided in an appropriate position and driven is desirably used.

After installation of the temporary winch rail 50 and the temporary winch 51 is finished and hoisting and lowering preparation of the placement device P is completed, the process moves to the opening forming step.

Figure 4:
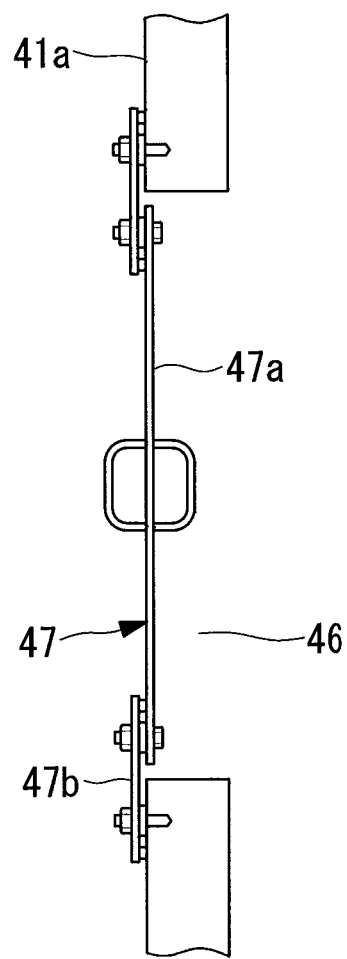
FIG. 4 is an enlarged sectional view of essential parts of the lid for access and maintenance in FIG. 3.

The opening forming step is, for example, as shown in FIG. 4, a step of removing the maintenance hatch 45 from the head capsule 42 of the rotor head 4 to form the hoisting and lowering opening 43 of the replacement device P.

A plurality of (for example, three; the same number as the wind turbine blades 5) maintenance hatches 45 are provided at regular pitches circumferentially of the head capsule 42, but it is sufficient that at least one maintenance hatch is provided. Specifically, the maintenance hatch 45 is desirably openably/closably mounted to the hoisting and lowering opening 43 exclusively for a hoisting and lowering operation formed in the head capsule 42 of the rotor head 4.

The maintenance hatch 45 is opened by an operator moving through the tower 2 and the nacelle 3 to the inside of the rotor head 4, and is configured to be removed inward in the rotor head 4. At this time, the temporary winch 51 can be used as required.

The maintenance hatch 45 thus removed is fixedly installed in an appropriate position in the head capsule 42 until operation steps described below are finished.

The structure of the maintenance hatch 45 is not particularly limited, but the maintenance hatch 45 may be, for example, rotatably supported by the head capsule 42 via a hinge.

After the hoisting and lowering opening 43 is formed in the head capsule 42 of the rotor head 4, the process moves to the hoisting and lowering step of hoisting and lowering the replacement device P through the opening in the maintenance hatch with the temporary winch 51.

In the hoisting and lowering step, the replacement device P to be attached or removed in the rotor head 4 is hoisted and lowered through the hoisting and lowering opening 43 with the maintenance hatch 45 opened by driving the temporary winch 51.

Figure 3:
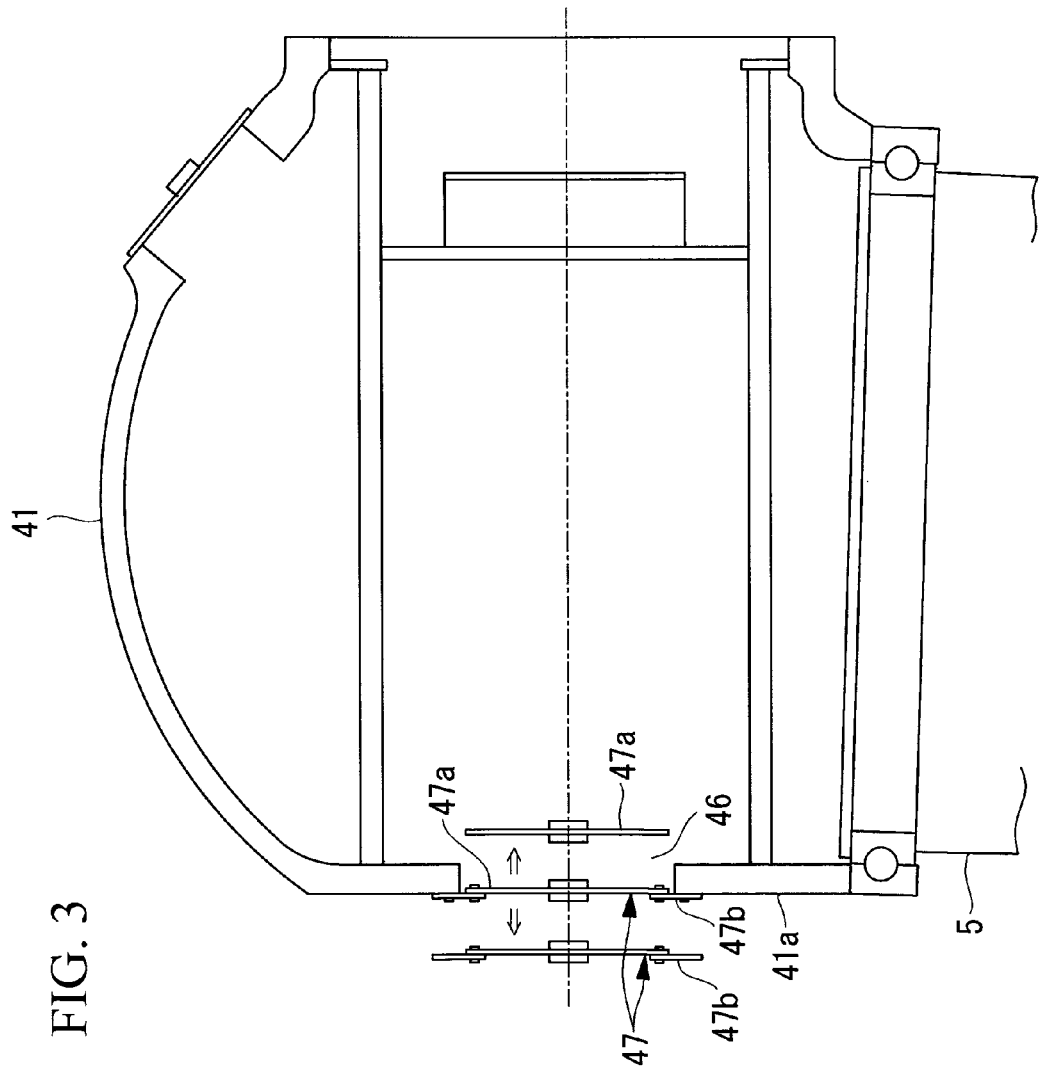
FIG. 3 is a sectional view of a structure example of a double-doored lid for access and maintenance provided on a front end surface of the rotor head.

Specifically, the replacement device P installed in the rotor head body 41 is removed and conveyed close to the maintenance opening 46. The maintenance opening 46 is closed by, for example, a double-doored lid member 47 as shown in FIGS. 3 and 4, and thus the lid member 47 is removed to ensure a conveying path of the replacement device P.

The lid member 47 is removable by a bolt or the like from both inside and outside the rotor head body 41.

Specifically, the entire lid member 47 is removed from outside the rotor head body 41 to form the maintenance opening 46, and a middle portion 47a of the lid member 47 is removed from an outer frame portion 47b from inside the rotor head body 41 to form the maintenance opening 46.

Then, the temporary winch 51 is moved along the temporary winch rail 50 close to the maintenance opening 46, and the replacement device P is locked on a hook 52a provided at a front end of the wire rope 52 and lifted to a predetermined position. The replacement device P thus lifted to the predetermined position can be moved to the hoisting and lowering opening 43 together with the temporary winch 51 without interfering with a wall surface of the front end 41a.

After the temporary winch 51 is moved along the temporary winch rail 50 and the replacement device P is moved upward of the hoisting and lowering opening 43, the temporary winch 51 is driven to extend the wire rope 52 and lower the replacement device P to the ground.

After the removed replacement device P is thus lowered to the ground, the temporary winch 51 is driven to wind up the wire rope 52 with the replacement device P to be lifted, if any, locked on the hook 52a, or as it is without a replacement device P. Then, the temporary winch 51 is moved along the temporary winch rail 50 close to the maintenance opening 46 to move the lifted replacement device P, if any, to a floor surface of the rotor head body 41.

Then, the replacement device P is conveyed in the rotor head body 41 and mounted to a predetermined position.

After the hoisting and lowering operation of the replacement device P is thus finished, that is, the hoisting and lowering step is finished, the step of closing the maintenance hatch 45 in rotor head 4 reversely to the opening forming step, the step of removing the temporary winch 51 from the temporary winch rail 50, and the step of removing the temporary winch rail 50 from the rail support portion 44 are performed to finish the device hoisting and lowering operation in the rotor head 4.

According to the above-described method for hoisting and lowering a device in a rotor head of the embodiment, the temporary winch 51 installed in the rotor head 4 hoists and lowers the replacement device P in the rotor head 4 to perform the replacement operation, and thus there is no need to use an external crane. This can reduce costs for preparing an external crane, and also facilitate hoisting and lowering and replacement operations of the replacement device P irrespective of conditions such as geographic features of a place where the wind turbine generator 1 is installed.

Second Embodiment

Figure 5:
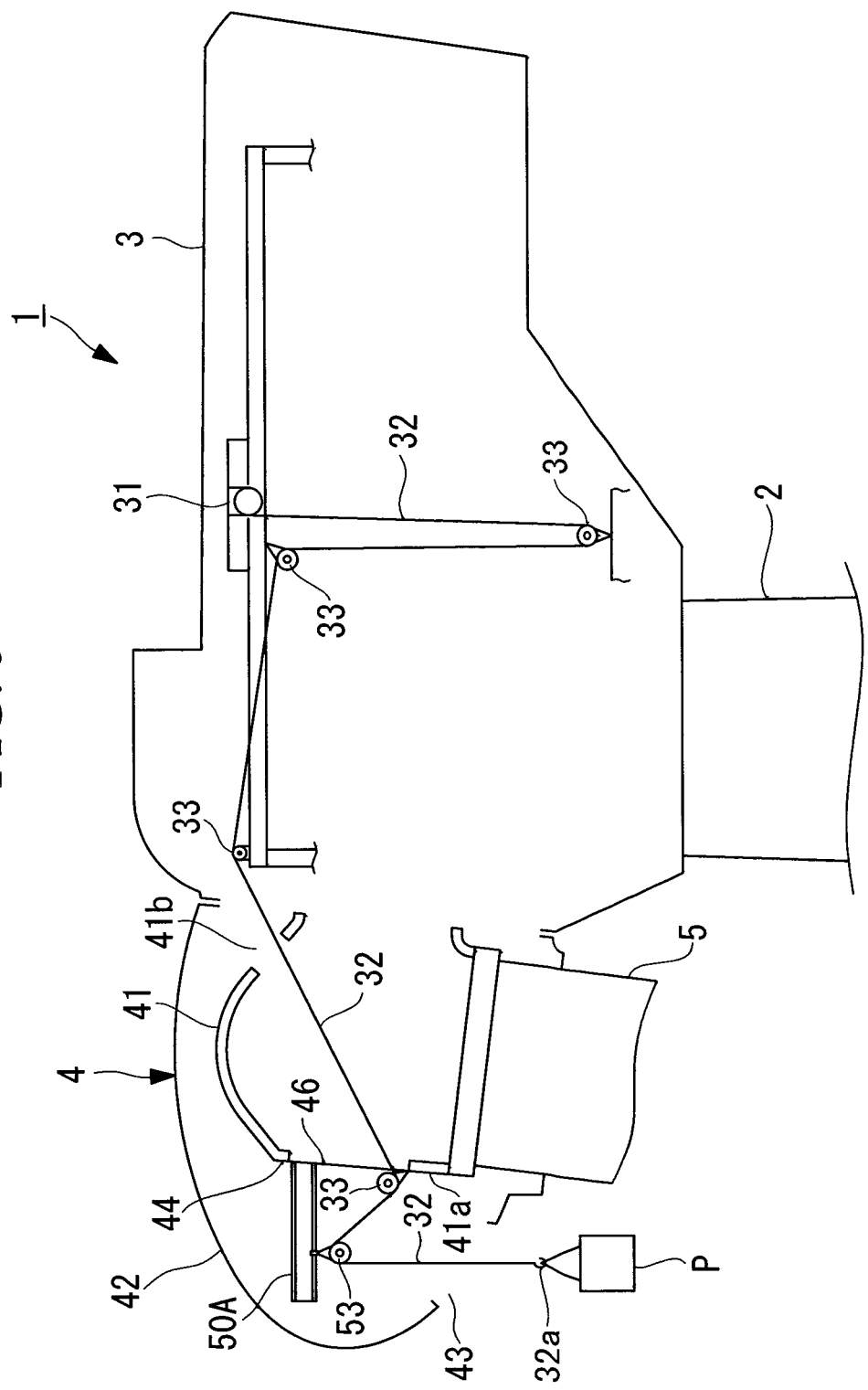
FIG. 5 is a schematic sectional view of a nacelle and a rotor head for illustrating a second embodiment of a method for hoisting and lowering a device in a rotor head of a wind turbine generator according to the present invention.

A second embodiment of a method for hoisting and lowering a device in a rotor head of a wind turbine generator according to the present invention will be described with reference to FIG. 5. The same components as in the above-described embodiment are denoted by the same reference numerals, and detailed descriptions thereof will be omitted.

The method for hoisting and lowering a device in a rotor head of a wind turbine generator of this embodiment includes the step of mounting a temporary winch rail 50A provided with a hoisting and lowering pulley 53 to a rail support portion 44 previously provided in a rotor head 4 (hereinafter, referred to as "pulley-equipped rail temporarily providing step"), the step of opening a maintenance hatch 45 provided in the rotor head 4 (hereinafter referred to as "opening forming step"), the step of suspending a hook 32a at a front end from the hoisting and lowering pulley 53 via one or more pulleys 33 installed in an appropriate position in a nacelle 3 and the rotor head 4 using a wire rope 32 of an in-nacelle winch 31 permanently provided in the nacelle 3 (hereinafter referred to as "wire rope preparation step"), and the step of hoisting and lowering a replacement device P to be attached or removed in the rotor head 4 through an opening in the maintenance hatch 45 by the in-nacelle winch 31 (hereinafter referred to as "hoisting and lowering step").

In this embodiment, the pulley-equipped rail temporarily providing step is different from the above-described embodiment in that the temporary winch rail 50A provided with the pulley 53 is used instead of the temporary winch rail 50. The pulley-equipped rail temporarily providing step is substantially the same as the above-described rail temporarily providing step other than that the different temporary winch rail 50A is used.

The opening forming step after the pulley-equipped rail temporarily providing step is also the same as in the above-described embodiment.

However, the next wire rope preparation step is performed instead of the step of installing the temporary winch 51 in the above-described embodiment, and performed for allowing hoisting and lowering using the in-nacelle winch 31 permanently provided the nacelle 3.

In this step, an operation is performed for extending an in-nacelle wire rope 32, winding the in-nacelle wire rope 32 around the pulley 33 installed in the nacelle 3 or the rotor head body 41 that constitutes the rotor head 4, and finally suspending the hook 32a mounted to the front end of the wire rope 32 from the hoisting and lowering pulley 53. At this time, the in-nacelle wire rope 32 passes through an access opening 41b provided in the rotor head body 41. In the shown exemplary configuration, the wire rope 32 passes through three pulleys 33 installed in the nacelle 3 and one pulley 33 installed in the rotor head body 41, but not limited to this, and may pass through at least one pulley 33 installed in an appropriate position depending on conditions.

The hoisting and lowering step after the wire rope preparation step is substantially the same as in the above-described embodiment other than that the in-nacelle winch 31 is used instead of the temporary winch 51.

According to the above-described method for hoisting and lowering a device in a rotor head of the embodiment, the in-nacelle winch 31 causes the wire rope 32 passing through the pulley 33 and the hoisting and lowering pulley 53 to hoist and lower the replacement device P in the rotor head 4 to perform a replacement operation, and thus there is no need to use an external crane. This can reduce costs for preparing an external crane, and also facilitate hoisting and lowering and replacement operations of the replacement device P irrespective of conditions such as geographic features of a place where the wind turbine generator 1 is installed.

Third Embodiment

Figure 6:
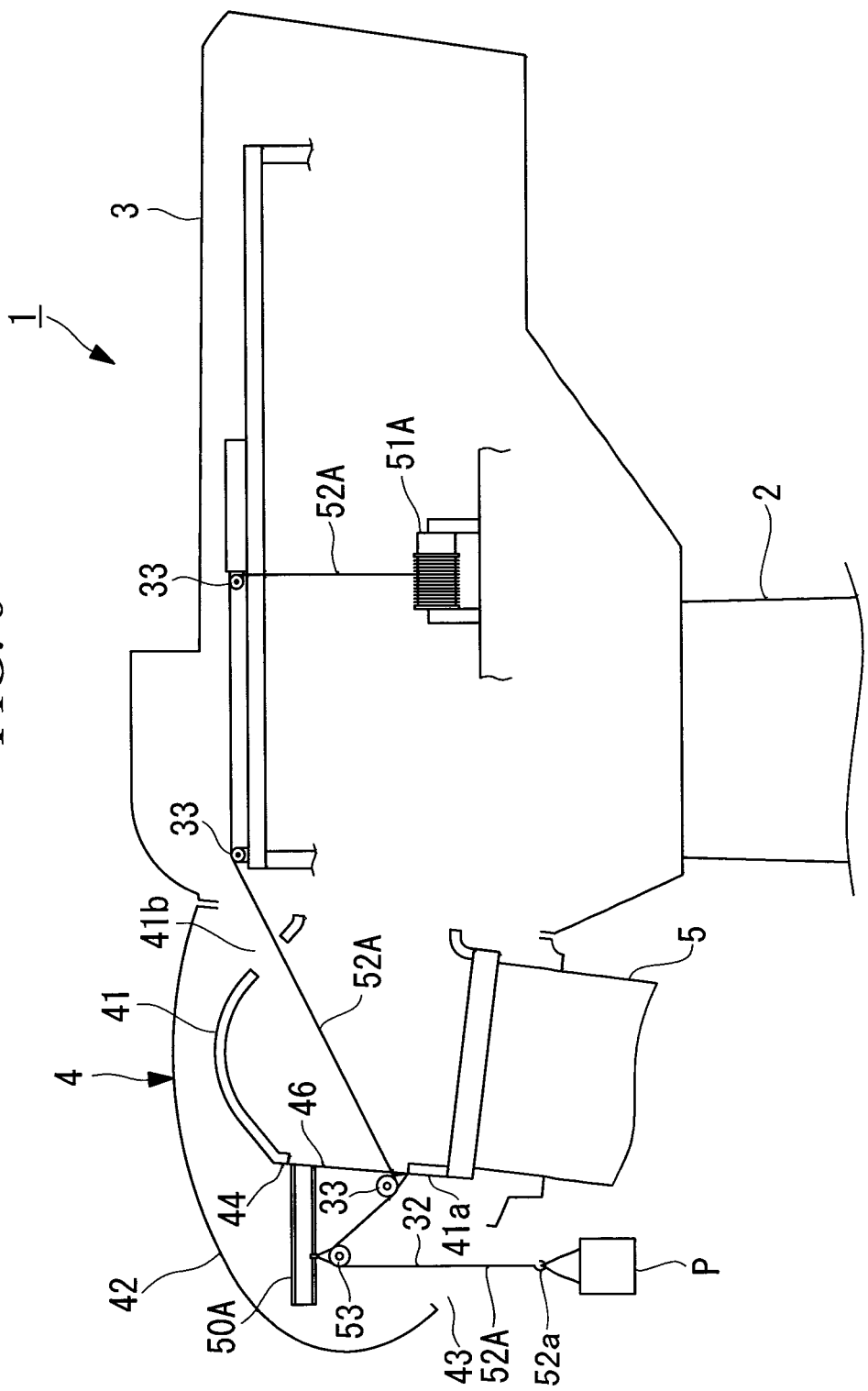
FIG. 6 is a schematic sectional view of a nacelle and a rotor head for illustrating a third embodiment of a method for hoisting and lowering a device in a rotor head of a wind turbine generator according to the present invention.

A third embodiment of a method for hoisting and lowering a device in a rotor head of a wind turbine generator according to the present invention will be described with reference to FIG. 6. The same components as in the above-described embodiment are denoted by the same reference numerals, and detailed descriptions thereof will be omitted.

The method for hoisting and lowering a device in a rotor head of a wind turbine generator of this embodiment includes the step of mounting a temporary winch rail 50A provided with a hoisting and lowering pulley 53 to a rail support portion 44 previously provided in a rotor head 4 (hereinafter, referred to as pulley-equipped rail temporarily providing step"), the step of installing a temporary winch 51A in a nacelle 3 (hereinafter referred to as "winch temporarily providing step"), the step of opening a maintenance hatch 45 provided in the rotor head 4 (hereinafter referred to as "opening forming step"), the step of suspending a hook 52a mounted to a front end of a wire rope 52A from a hoisting and lowering pulley 53 via one or more pulleys 33 installed in an appropriate position in the nacelle 3 and the rotor head 4 using the wire rope 52A of the temporary winch 51A (hereinafter referred to as "wire rope preparation step"), and the step of hoisting and lowering a replacement device P to be attached or removed in the rotor head 4 through an opening in the maintenance hatch 45 by the temporary winch 51A (hereinafter referred to as "hoisting and lowering step").

In this embodiment, the pulley-equipped rail temporarily providing step is the same as in the above-described embodiment.

The next winch temporarily providing step is different from the above-described embodiment in that the temporary winch 51A is installed in the nacelle 3, and the subsequent opening forming step is the same as in the above-described embodiment.

The wire rope preparation step is different from that in the above-described embodiment in that the used winch is changed from the in-nacelle winch 31 to the temporary winch 51A, and thus the wire rope 52A is wound around the pulley 33 and the hoisting and lowering pulley 53. The number or installation positions of the pulleys 33 are different depending on installation positions of the temporary winch 51A.

The hoisting and lowering step after the wire rope preparation step is substantially the same as in the above-described embodiment other than that the temporary winch 51A is used instead of the temporary winch 51 and the in-nacelle winch 31.

According to the method for hoisting and lowering a device in a rotor head of the embodiment, the temporary winch 51A causes the wire rope 52A passing through the pulley 33 and the hoisting and lowering pulley 53 to hoist and lower the replacement device P in the rotor head 4, and thus there is no need to use an external crane. The temporary winch 51A can easily lift, for example, the in-nacelle winch 31 capable of lifting a load of 1 t to install the in-nacelle winch 31, and hence is suitable for replacement of a heavy device. This can reduce costs for preparing an external crane, and also facilitate hoisting and lowering and replacement operations of the replacement device P irrespective of conditions such as geographic features of a place where the wind turbine generator 1 is installed.

As such, according to the above-described embodiments, when hoisting and lowering and replacement operations of the replacement device P installed in the rotor head 4 are performed, particularly, when a device replacement operation of a heavy load is performed, the temporary winch 51 or 51A or the in-nacelle winch 31 permanently provided in the nacelle 3 can be used to easily perform the hoisting and lowering operation, thereby eliminating the need for an external crane.

The present invention is not limited to the above-described embodiments, and may be changed without departing from the gist thereof.

The invention claimed is:

1. A method for hoisting and lowering a device in a rotor head of a wind turbine generator, in which a rotor head rotated by wind power applied to a wind turbine blade drives a generator installed in a nacelle and generates electricity, and the nacelle is installed on an upper end of a tower standing on a foundation, comprising steps of:
mounting a temporary winch rail to a rail support portion previously provided in the rotor head;
installing a temporary winch on the temporary winch rail;
opening a maintenance hatch provided in the rotor head; and
hoisting and lowering a replacement device to be attached or removed in the rotor head through an opening in the maintenance hatch by the temporary winch.

2. The method for hoisting and lowering a device in a rotor head of a wind turbine generator according to claim 1, wherein the maintenance hatch is openably/closably mounted to an opening exclusively for a hoisting and lowering operation formed in a head capsule of the rotor head.

3. The method of claim 1, wherein:
the action of mounting the temporary winch rail to the rail support portion previously provided in the rotor head includes mounting the temporary winch rail such that the temporary winch rail protrudes from a front end of the rotor head.

4. The method of claim 1, wherein:
the action of mounting the temporary winch rail to the rail support portion previously provided in the rotor head includes mounting the temporary winch rail such that the temporary winch rail is supported by a rotor head body of the rotor head.

5. The method of claim 1, wherein:
the action of hoisting and lowering the replacement device includes extending at least a portion of a cable in a direction at least substantially normal to the direction of gravity and in front of the rotor head.

6. A method for hoisting and lowering a device in a rotor head of a wind turbine generator, in which a rotor head rotated by wind power applied to a wind turbine blade drives a generator installed in a nacelle and generates electricity, and the nacelle is installed on an upper end of a tower standing on a foundation, comprising steps of:
mounting a temporary winch rail including a hoisting and lowering pulley to a rail support portion previously provided in the rotor head;
opening a maintenance hatch provided in the rotor head;
suspending an end of a wire rope of an in-nacelle winch that is permanently provided in the nacelle from the hoisting and lowering pulley via one or more pulleys installed in an appropriate position in the nacelle and the rotor head; and
hoisting and lowering a replacement device to be attached or removed in the rotor head through an opening in the maintenance hatch by the in-nacelle winch.

7. The method of claim 6, wherein:
the action of mounting the temporary winch rail to the rail support portion previously provided in the rotor head includes mounting the temporary winch rail such that the temporary winch rail protrudes from a front end of the rotor head.

8. The method of claim 6, wherein:
the action of mounting the temporary winch rail to the rail support portion previously provided in the rotor head includes mounting the temporary winch rail such that the temporary winch rail is supported by a rotor head body of the rotor head.

9. The method of claim 6, wherein:
the action of hoisting and lowering the replacement device includes extending at least a portion of the wire rope in a direction at least substantially normal to the direction of gravity and in front of the rotor head.

10. A method for hoisting and lowering a device in a rotor head of a wind turbine generator, in which a rotor head rotated by wind power applied to a wind turbine blade drives a generator installed in a nacelle and generates electricity, and the nacelle is installed on an upper end of a tower standing on a foundation, comprising steps of:
mounting a temporary winch rail including a hoisting and lowering pulley to a rail support portion previously provided in the rotor head;
installing a temporary winch in the nacelle;
opening a maintenance hatch provided in the rotor head;
suspending an end of a wire rope of the temporary winch from the hoisting and lowering pulley via one or more pulleys installed in an appropriate position in the nacelle and the rotor head; and
hoisting and lowering a replacement device to be attached or removed in the rotor head through an opening in the maintenance hatch by the temporary winch.

11. The method of claim 10, wherein:
the action of mounting the temporary winch rail to the rail support portion previously provided in the rotor head includes mounting the temporary winch rail such that the temporary winch rail protrudes from a front end of the rotor head.

12. The method of claim 10, wherein:
the action of mounting the temporary winch rail to the rail support portion previously provided in the rotor head includes mounting the temporary winch rail such that the temporary winch rail is supported by a rotor head body of the rotor head.

13. The method of claim 10, wherein:
the action of hoisting and lowering the replacement device includes extending at least a portion of the wire rope in a direction at least substantially normal to the direction of gravity and in front of the rotor head.

* * * * *